(12) United States Patent
Shimamoto et al.

(10) Patent No.: US 11,141,957 B2
(45) Date of Patent: Oct. 12, 2021

(54) INTERMEDIATE FILM FOR LAMINATED GLASS, AND LAMINATED GLASS

(71) Applicant: SEKISUI CHEMICAL CO., LTD., Osaka (JP)

(72) Inventors: Michio Shimamoto, Kouka (JP); Shota Matsuda, Osaka (JP); Sinyul Yang, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/290,918

(22) Filed: Mar. 3, 2019

(65) Prior Publication Data

US 2019/0193377 A1  Jun. 27, 2019

Related U.S. Application Data

(63) Continuation of application No. 14/371,938, filed as application No. PCT/JP2013/050463 on Jan. 11, 2013, now Pat. No. 10,226,912.

(30) Foreign Application Priority Data

Jan. 13, 2012  (JP) ................. 2012-005319

(51) Int. Cl.
*B32B 17/10* (2006.01)
*C08K 5/00* (2006.01)
*C08K 5/11* (2006.01)

(52) U.S. Cl.
CPC .. *B32B 17/10605* (2013.01); *B32B 17/10036* (2013.01); *B32B 17/10761* (2013.01);
(Continued)

(58) Field of Classification Search
CPC ........ B32B 17/10036; B32B 17/10605; B32B 17/10761; B32B 2250/40;
(Continued)

(56) References Cited

U.S. PATENT DOCUMENTS 3,202,567 A  8/1965 Muri et al.
3,644,116 A  2/1972 Andrews et al.
(Continued)

FOREIGN PATENT DOCUMENTS

CN  101637991 A  2/2010
EP  1 281 690 A1  2/2003
(Continued)

OTHER PUBLICATIONS

Machine translation of JP-2009161584-A, retrieved Jan. 29, 2020. (Year: 2009).*

(Continued)

*Primary Examiner* — Callie E Shosho
*Assistant Examiner* — Krupa Shukla
(74) *Attorney, Agent, or Firm* — Cheng Law Group, PLLC

(57) ABSTRACT

An interlayer film for laminated glass that can improve a sound insulation property of an obtained laminated glass when the interlayer film for laminated glass is used for configuring the laminated glass is provided. The interlayer film for laminated glass according to the present invention includes a first layer and a second layer laminated on a first surface of the first layer. The first layer includes a polyvinyl acetate resin and a plasticizer.

8 Claims, 1 Drawing Sheet

(52) U.S. Cl.
CPC .............. *C08K 5/0016* (2013.01); *C08K 5/11* (2013.01); *B32B 2250/40* (2013.01); *B32B 2307/102* (2013.01); *B32B 2331/04* (2013.01); *Y10T 428/31649* (2015.04); *Y10T 428/31859* (2015.04); *Y10T 428/31935* (2015.04)

(58) Field of Classification Search
CPC .......... B32B 2307/102; B32B 2331/04; C08K 5/0016; C08K 5/11; Y10T 428/31649; Y10T 428/31859; Y10T 428/31935
See application file for complete search history.

(56) References Cited

U.S. PATENT DOCUMENTS

| | | | |
|---|---|---|---|
| 4,913,846 | A | 4/1990 | Suzuki et al. |
| 4,942,102 | A | 7/1990 | Keys et al. |
| 9,821,535 | B2 * | 11/2017 | Shimamoto .......... C09D 129/14 |
| 10,226,912 | B2 * | 3/2019 | Shimamoto ....... B32B 17/10605 |
| 2004/0234731 | A1 | 11/2004 | Rinehart et al. |
| 2004/0253554 | A1 | 12/2004 | Marx et al. |
| 2005/0186379 | A1 | 8/2005 | Rhee et al. |
| 2006/0106164 | A1 | 5/2006 | Suzuki |
| 2009/0305058 | A1 | 12/2009 | Marumoto |
| 2010/0028642 | A1 | 2/2010 | Steuer et al. |
| 2010/0233453 | A1 * | 9/2010 | Hashimoto ....... B32B 17/10018 428/216 |
| 2012/0244364 | A1 | 9/2012 | Iwamoto et al. |
| 2012/0263958 | A1 | 10/2012 | Iwamoto et al. |
| 2015/0258751 | A1 | 9/2015 | Shimamoto et al. |
| 2016/0121584 | A1 | 5/2016 | Iwamoto et al. |

FOREIGN PATENT DOCUMENTS

| | | | |
|---|---|---|---|
| GB | 461684 | A | 2/1937 |
| GB | 470135 | A | 8/1937 |
| GB | 471904 | A | 9/1937 |
| GB | 821537 | A | 10/1959 |
| GB | 1 515 869 | A | 7/1978 |
| JP | 37-18625 | | 12/1962 |
| JP | 51-84878 | A | 7/1976 |
| JP | 8-59306 | A | 3/1996 |
| JP | 11-287797 | A | 10/1999 |
| JP | 2000-247690 | A | 9/2000 |
| JP | 2003-252655 | A | 9/2003 |
| JP | 2005-502512 | A | 1/2005 |
| JP | 2006-278445 | A | 10/2006 |
| JP | 2006-290948 | A | 10/2006 |
| JP | 2007-70200 | A | 3/2007 |
| JP | 2007-253469 | A | 10/2007 |
| JP | 2009-161584 | A | 7/2009 |
| JP | 2009161584 | A * | 7/2009 |
| JP | 2011-42552 | A | 3/2011 |
| JP | 2011-207762 | A | 10/2011 |

OTHER PUBLICATIONS

International Search Report for the Application No. PCT/JP2013/050463 dated Apr. 16, 2013.
Written Opinion of the International Searching Authority (PCT/ISA/237) for Application No. PCT/JP2013/050463 dated Apr. 16, 2013.
Supplementary European Search Report for Application No. EP 13 73 6084 dated Jul. 15, 2015.
The First Office Action for the Application No. 201380002680.4 from The State Intellectual Property Office of the People's Republic of China dated Aug. 26, 2015.
The Second Office Action for the Application No. 201380002680.4 from The State Intellectual Property Office of the People's Republic of China dated Mar. 28, 2016.

* cited by examiner

[FIG. 1]
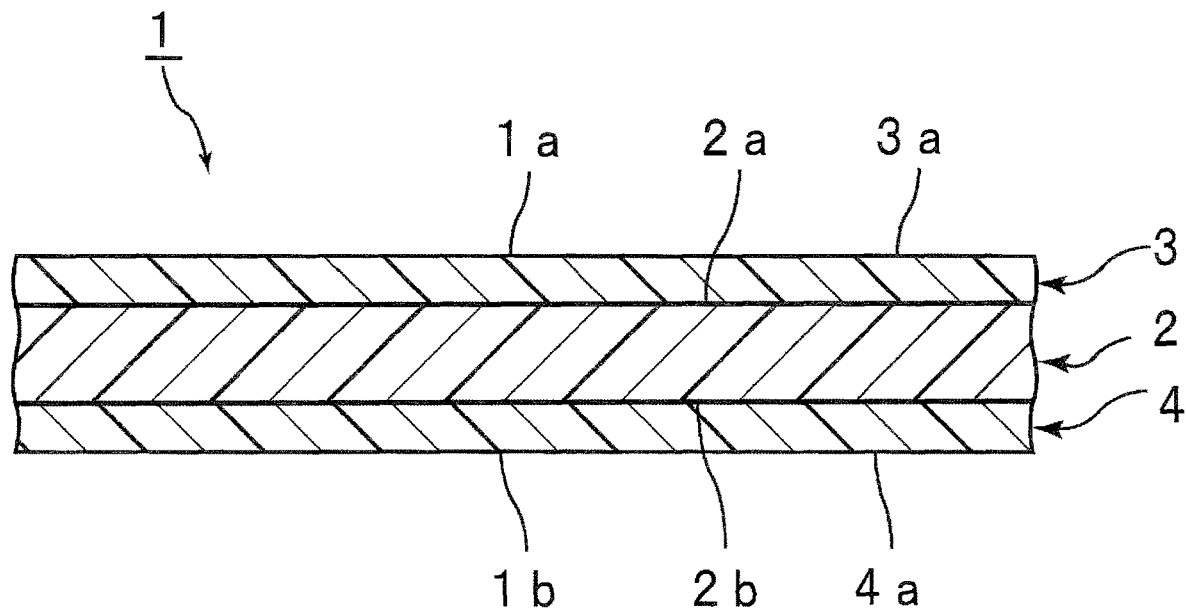
[FIG. 2]
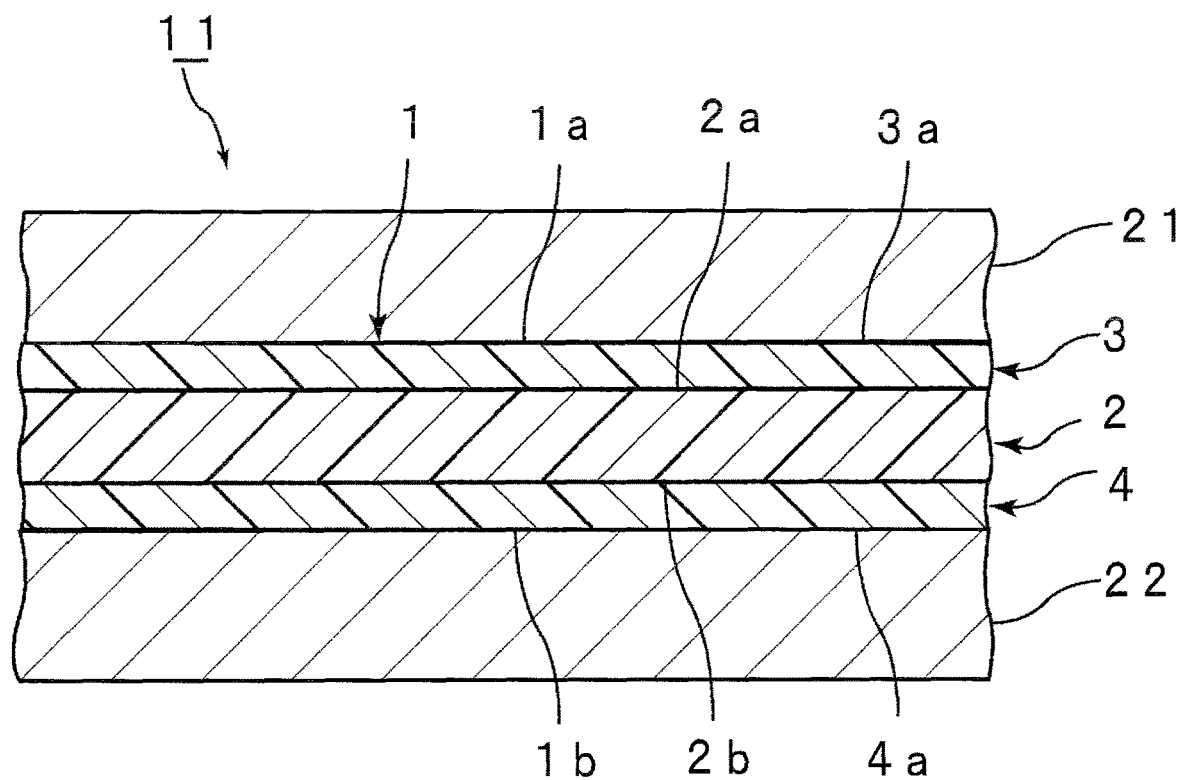

ND STATES PATENT NO. US 11,141,957 B2

INTERMEDIATE FILM FOR LAMINATED GLASS, AND LAMINATED GLASS

CROSS-REFERENCE TO RELATED APPLICATIONS

This application is a Continuation Application of patent application Ser. No. 14/371,938, filed on Jul. 11, 2014, which is a 371 application of Application Serial No. PCT/JP2013/050463, filed on Jan. 11, 2013, which is based on Japanese Patent Application No. 2012-005319 filed on Jan. 13, 2012, the entire contents of which are hereby incorporated by reference.

TECHNICAL FIELD

The present invention relates to an interlayer film for laminated glass used for automobiles and architectural structures and the like, and more particularly relates to an interlayer film for laminated glass containing a thermoplastic resin and a plasticizer. In addition, the present invention relates to a laminated glass made by using the interlayer film for laminated glass.

BACKGROUND ART

A laminated glass has excellent safety because a flying amount of broken pieces of glass is small if the laminated glass was broken by being subject to external impact. Therefore, the laminated glass is widely used for automobiles, railway cars, aircraft, ships, and architectural structures and the like. The laminated glass is manufactured by sandwiching an interlayer film between a pair of glass plates.

In recent years, reduction in the thickness of the laminated glass has been studied in order to reduce the weight of the laminated glass. When the thickness of the laminated glass is reduced, however, a sound insulation property is deteriorated. When the laminated glass having a low sound insulation property is used for a windshield of an automobile and the like, a problem that a sufficient sound insulation property for sound in a sound range of about 5000 Hz such as wind noise and driving noise of wipers cannot be obtained arises.

Consequently, improvement of the sound insulation property of the laminated glass by modifying materials of the interlayer film has been studied.

As one example of the interlayer film for laminated glass, Patent Document 1 discloses a sound insulation layer including 100 parts by weight of a polyvinyl acetal resin having an acetalization degree of 60 to 85 mol %, 0.001 to 1.0 parts by weight of at least one metal salt of alkaline metal salts and alkaline earth metal salts, and 30% by weight or more of a plasticizer. The sound insulation layer is used as a single layer interlayer film or a multi-layer interlayer film formed by laminating with other layers.

RELATED ART DOCUMENT

Patent Document

Patent Document 1: JP 2007-070200 A

SUMMARY OF THE INVENTION

Problems to be Solved by the Invention

Although the laminated glass made by using the interlayer film described in Patent Document 1 described above can improve the sound insulation property to some extent, further improvement of the sound insulation property is required.

The sounds to be insulated by the interlayer film include air-borne sound such as noise of an automobile and sound of a horn and solid-borne sound such as sound of vibration of an engine of an automobile. The laminated glass using the interlayer film described in Patent Document 1 may not sufficiently improve the sound insulation property for the solid-borne sound in particular.

In recent years, substitution from a fuel vehicle using an internal combustion engine to an electric vehicle using an electric motor and a hybrid electric vehicle using an internal combustion engine and an electric motor has proceeded. For the laminated glass used for the fuel vehicle using the internal combustion engine, the sound insulation property relatively in a low frequency range is particularly required. For the laminated glass used for the fuel vehicle using the internal combustion engine, however, the high sound insulation property in a high frequency range is also desired. On the contrary, for the laminated glass used in the electric vehicle and the hybrid electric vehicle using the electric motor, the high sound insulation property in the high frequency range is particularly required in order to effectively cut off the driving sound of the electric motor.

When the laminated glass is configured by using the interlayer film described in Patent Document 1, the laminated glass has an insufficient sound insulation property in the high frequency range, and thus, deterioration in the sound insulation property caused by a coincidence effect may not be avoided. In particular, the laminated glass may have an insufficient sound insulation property at about 20° C.

Here, the coincidence effect is a phenomenon in which, when sound waves are incident into a glass plate, resonance of a transverse wave and the incident sound is generated by propagating the transverse wave on the grass surface due to rigidity and inertia of the glass, and as a result, transmission of the sound occurs.

In recent years, addition of an excessive amount of plasticizer to the interlayer film has also been studied in order to improve the sound insulation property of the laminated glass. The sound insulation property of the laminated glass can be improved by adding the excessive amount of the plasticizer to the interlayer film. Use of the excessive amount of the plasticizer, however, may cause the plasticizer to bleed out to the surface of the interlayer film.

The purpose of the present invention is to provide the interlayer film for laminated glass that can improve the sound insulation property of the obtained laminated glass when the interlayer film is used for configuring the laminated glass, and the laminated glass made by using the interlayer film for laminated glass.

The limited purpose of the present invention is to provide the interlayer film for laminated glass that can improve the sound insulation property in the high frequency range of the obtained laminated glass when the interlayer film is used for configuring the laminated glass, and the laminated glass made by using the interlayer film for laminated glass.

Means for Solving the Problems

According to a broad aspect of the present invention, an interlayer film for laminated glass including a first layer; and a second layer laminated on a first surface of the first layer, wherein the first layer includes a polyvinyl acetate resin and a plasticizer is provided.

In a particular aspect of the interlayer film for laminated glass according to the present invention, the polyvinyl acetate resin and the plasticizer included in the first layer are a polyvinyl acetate resin and a plasticizer having a cloud point of 80° C. or less that is measured by using a solution in which 8 parts by weight of the polyvinyl acetate resin is dissolved in 100 parts by weight of the plasticizer.

In another particular aspect of the interlayer film for laminated glass according to the present invention, the first layer includes a tackifier.

In further another particular aspect of the interlayer film for laminated glass according to the present invention, the second layer includes a polyvinyl acetal resin and the polyvinyl acetal resin in the second layer has an acetylation degree of 15 mol % or less and a hydroxyl group content of 20 mol % or more.

In another particular aspect of the interlayer film for laminated glass according to the present invention, the interlayer film further includes a third layer laminated on a second surface opposite to the first surface of the first layer, wherein the third layer includes a polyvinyl acetal resin and the polyvinyl acetal resin in the third layer has an acetylation degree of 15 mol % or less and a hydroxyl group content of 20 mol % or more.

In further another particular aspect of the interlayer film for laminated glass according to the present invention, the first layer includes a tackifier, wherein the tackifier is a rosin resin.

A laminated glass according to the present invention includes a first component for laminated glass; a second component for laminated glass; and an interlayer film sandwiched between the first component for laminated glass and the second component for laminated glass, wherein the interlayer film is the interlayer film for laminated glass described above.

Effect of the Invention

The interlayer film for laminated glass according to the present invention includes the first layer and the second layer laminated on the first surface of the first layer, and further, the first layer includes the polyvinyl acetate resin and the plasticizer, and thus, the sound insulation property of the laminated glass using the interlayer film for laminated glass according to the present invention can be improved.

BRIEF DESCRIPTION OF DRAWINGS

FIG. 1 is a partially cross-sectional view schematically illustrating an interlayer film for laminated glass according to one embodiment of the present invention.

FIG. 2 is a partially cross-sectional view schematically illustrating an example of a laminated glass using the interlayer film for laminated glass illustrated in FIG. 1.

MODE(S) FOR CARRYING OUT THE INVENTION

Hereinafter, the present invention will be clarified by describing specific embodiments and examples of the present invention with reference to the drawings.

In FIG. 1, an interlayer film for laminated glass according to one embodiment of the present invention is schematically illustrated as a partially cross-sectional view.

The interlayer film 1 illustrated in FIG. 1 is a multi-layer interlayer film. The interlayer film 1 is used for obtaining a laminated glass. The interlayer film 1 is an interlayer film for laminated glass. The interlayer film 1 includes a first layer 2, a second layer 3 laminated on a first surface 2a of the first layer 2, and a third layer 4 laminated on a second surface 2b opposite to the first surface 2a of the first layer 2. The first layer 2 is an intermediate layer and mainly functions as a sound insulation layer. The second and the third layers 3, 4 are protection layers and, in this embodiment, surface layers. The first layer 2 is sandwiched between the second and the third layers 3, 4. The interlayer film 1, therefore, has a multi-layer structure in which the second layer 3, the first layer 2, and the third layer 4 are laminated in this order.

Compositions of the second layer 3 and the third layer 4 may be the same as or different from each other. When the polyvinyl acetal resin is included in the second and the third layers 3, 4, adhesion force between the second and the third layers 3, 4 and the component for laminated glass is sufficiently high.

Main characteristics of this embodiment is that the interlayer film 1 includes the first layer 2 and the second layer 3 laminated on the first surface 2a of the first layer 2 and further the first layer 2 includes the polyvinyl acetate resin and the plasticizer. By this structure, the sound insulation property of the laminated glass using the interlayer film 1 can be improved. Further, the sound insulation property of the laminated glass using the interlayer film 1 in the high frequency range can also be improved. Particularly, the sound insulation property in a high frequency range exceeding 3 kHz can be effectively improved.

In the interlayer film 1, the second and the third layers 3, 4 are laminated one by one on both sides of the first layer 2. The second layer should be laminated on at least one surface of the first layer. The second layer may be laminated only on the first surface of the first layer and the third layer may not be laminated on the second surface of the first layer. It is desirable, however, that the second layer is laminated on the first surface of the first layer and the third layer is laminated on the second surface of the first layer. Penetration resistance of the laminated glass using the interlayer film becomes further higher by laminating the third layer on the second surface of the first layer.

From the viewpoint of further improvement of the sound insulation property of the laminated glass, the polyvinyl acetate resin and the plasticizer included in the first layer are preferably a polyvinyl acetate resin and a plasticizer having a cloud point of 80° C. or less that is measured by using a solution in which 8 parts by weight of the polyvinyl acetate resin is dissolved in 100 parts by weight of the plasticizer. Although the lower limit of the cloud point is not particularly limited, the cloud point may be 60° C. or more and may be 70° C. or more.

The cloud point described above is a cloud point measured according to JIS K2266 "Testing Methods for Pour Point of Crude Oil and Petroleum Products and Cloud Point of Petroleum Products". Specifically, the cloud point measured by using the polyvinyl acetate resin and the plasticizer means a temperature in which, when 3.5 g (100 parts by weight) of the plasticizer and 0.28 g (8 parts by weight) of the polyvinyl acetate resin are provided; 3.5 g (100 parts by weight) of the plasticizer and 0.28 g (8 parts by weight) of the polyvinyl acetate are mixed in a test tube (diameter 2 cm); a solution made by dissolving the polyvinyl acetate resin in the plasticizer is heated to 150° C.; and thereafter, when a temperature of the solution is lowered to −15° C. by allowing the test tube to stand under an atmosphere of −20° C. or the temperature of the solution is lowered to a pour point temperature of the plasticizer by allowing the test tube to stand under an atmosphere of −196° C., a part of the solution starts to cloud (a first determination method of the cloud point). A lower cloud point indicates higher compatibility of the polyvinyl acetate resin and the plasticizer. When the part of the solution starts to cloud by lowering the temperature of the solution to −15° C. by allowing the test tube to stand under the atmosphere of −20° C., the test tube is allowed to stand not under the atmosphere of −196° C. but under the atmosphere of −20° C.

The part of the solution may not cloud even when the temperature of the solution is lowered to the pour point temperature of the plasticizer. In this case, the cloud point is determined to be a temperature far below than 0° C. This case means that the compatibility of the polyvinyl acetate resin and the plasticizer is significantly high.

Consequently, when the cloud point is evaluated, 8 parts by weight of the polyvinyl acetate resin included in the first layer and 100 parts by weight of the plasticizer included in the first layer are provided, and thereafter, the solution made by dissolving 8 parts by weight of the polyvinyl acetate resin in 100 parts by weight of the plasticizer is used.

Examples of methods for measuring the temperature at which a part of the solution starts to cloud (cloud point) include a method for visually observing appearance of the solution, a method for measuring haze of the solution with a haze-meter, and a method in which several steps of boundary samples with respect to cloudiness is previously prepared and cloudiness is determined in comparison with the boundary samples. Among these methods, the method for visually observing the appearance of the solution is preferable. When the haze of the solution is measured with the haze-meter, a temperature at which a haze is 10% or more is determined to be the cloud point.

The cloud point measured by using the polyvinyl acetate resin and the plasticizer may also be determined in the manner that, when 3.5 g (100 parts by weight) of the plasticizer and 0.28 g (8 parts by weight) of the polyvinyl acetate resin are provided; 3.5 g (100 parts by weight) of the plasticizer and 0.28 g (8 parts by weight) of the polyvinyl acetate are mixed in a test tube (diameter 2 cm); a solution made by dissolving the polyvinyl acetate resin in the plasticizer is heated to 150° C.; then the test tube is allowed to stand for 1 hour in a constant temperature room of a predetermined temperature; and thereafter, when a haze of the solution in the test tube is measured with the haze-meter with the temperature of the constant temperature room being maintained, the haze is 10% or more or not (a second determination method of the cloud point). For example, a temperature at which a haze of 10% or more is indicated may be measured by allowing the test tube to stand for 1 hour in the constant temperature room of 80° C., and thereafter, measuring the haze of the solution in the test tube with the haze-meter with the temperature of the constant temperature room being maintained. The haze is preferably less than 10% when the haze of the solution in the test tube is measured using a haze-meter with the temperature of the constant temperature room being maintained after the test tube is allowed to stand for 1 hour in the constant temperature room of 80° C.

In the present invention, the cloud point may be determined by the first method for determining the cloud point or may be determined by the second method for determining the cloud point. The cloud point is preferably determined by the first method for determining the cloud point. In order to specify the cloud point with further accuracy, the second method for determining the cloud point can be employed.

Hereinafter, details of the first, the second, and the third layers configuring the interlayer film for laminated glass and details of each component included in the first, the second, and the third layers will be described.

(Thermoplastic Resin)

The first layer includes the polyvinyl acetate resin as a thermoplastic resin. The polyvinyl acetate resin in the first layer (hereinafter, may be referred to as a "polyvinyl acetate resin (1)) is not particularly limited. The polyvinyl acetate resin (1) is a thermoplastic resin. The polyvinyl acetate resin (1) can be used singly or in combination of two or more.

The polyvinyl acetate resin (1) can be obtained by polymerizing a polymerizable composition including vinyl acetate. The polyvinyl acetate resin (1) includes modified polyvinyl acetate resins. Further, the polyvinyl acetate resin (1) includes a copolymer of vinyl acetate and a polymerizable compound other than vinyl acetate (copolymer component). The polymerizable composition may include a polymerizable compound other than vinyl acetate. As the polymerizable compound, the polymerizable composition preferably includes vinyl acetate as a main component. When the polyvinyl acetate is a copolymer of vinyl acetate and the polymerizable compounds other than vinyl acetate, a ratio of a skeleton derived from vinyl acetate is preferably 50 mol % or more, more preferably 60 mol % or more, further preferably 70 mol % or more, particularly preferably 80 mol % or more, and most preferably 90 mol % or more in 100 mol % of the total skeleton of the copolymer (the polyvinyl acetate). Examples of the polymerizable compound other than vinyl acetate include a (meth)acrylic compound, a styrene compound, and an isoprene compound.

A polymerization degree of the polyvinyl acetate resin (1) is preferably 1000 or more, preferably 20000 or less, more preferably 15000 or less, and further preferably 5000 or less. When the polymerization degree is the lower limit or more, the interlayer film can further easily be obtained by extrusion molding. When the polymerization degree is the upper limit or lower, production efficiency of the interlayer film becomes further higher. From the viewpoint of increase in productivity, the polymerization degree of the polyvinyl acetate resin (1) is more preferably 1500 or more and particularly preferably 4000 or less.

The first layer preferably includes the polyvinyl acetal resin (hereinafter may be referred to as a polyvinyl acetal resin (1)). When the first layer includes the polyvinyl acetal resin (1), production efficiency of the interlayer film for laminated glass becomes higher. The polyvinyl acetal resin (1) is preferably a polyvinyl acetal resin having an acetylation degree of less than 8 mol % (hereinafter also referred to as a "polyvinyl acetal resin A") or a polyvinyl acetal resin having an acetylation degree of 8 mol % or more (hereinafter also referred to as a "polyvinyl acetal resin B").

The acetylation degree a of the polyvinyl acetal resin A is less than 8 mol %, preferably 7.5 mol % or less, preferably 7 mol % or less, preferably 6 mol % or less, preferably 5 mol % or less, preferably 0.1 mol % or more, preferably 0.5 mol % or more, preferably 0.8 mol % or more, preferably 1 mol % or more, preferably 2 mol % or more, preferably 3 mol % or more, and preferably 4 mol % or more. When the acetylation degree a is the upper limit or less and the lower limit or more, compatibility between the polyvinyl acetal resin A and the plasticizer becomes further higher, and thus, the sound insulation property of the laminated glass can be further improved.

The lower limit of the acetalization degree a of the polyvinyl acetal resin A is preferably 68 mol %, more preferably 70 mol %, further preferably 71 mol %, and particularly preferably 72 mol %, and the upper limit thereof is preferably 85 mol %, more preferably 83 mol %, further preferably 81 mol %, and particularly preferably 79 mol %. When the acetalization degree a is the lower limit or more, the sound insulation property of the laminated glass can be further improved. When the acetalization degree a is the upper limit or less, reaction time required for producing the polyvinyl acetal resin can be shortened.

A hydroxyl group content a of the polyvinyl acetal resin A is preferably 30 mol % or less, preferably 27.5 mol % or less, preferably 27 mol % or less, preferably 26 mol % or less, preferably 25 mol % or less, preferably 24 mol % or less, preferably 23 mol % or less, preferably 16 mol % or more, preferably 18 mol % or more, preferably 19 mol % or more, and preferably 20 mol % or more. When the hydroxyl group content a is the upper limit or less, the sound insulation property of the laminated glass can be further improved. When the hydroxyl group content a is the lower limit or more, adhesion force of the interlayer film can be further increased.

The polyvinyl acetal resin A is preferably a polyvinyl butyral resin.

The acetylation degree b of the polyvinyl acetal resin B is 8 mol % or more, preferably 9 mol % or more, preferably 10 mol % or more, preferably 11 mol % or more, preferably 12 mol % or more, preferably 30 mol % or less, preferably 28 mol % or less, preferably 26 mol % or less, preferably 24 mol % or less, preferably 20 mol % or less, and preferably 19.5 mol % or less. When the acetylation degree b is the lower limit or more, the sound insulation property of the laminated glass can be further improved. When the acetylation degree b is the upper limit or less, the reaction time required for producing the polyvinyl acetal resin B can be shortened. Among them, the acetylation degree b of the polyvinyl acetal resin B is preferably less than 20 mol % because the reaction time required for producing the polyvinyl acetal resin B can be further shortened.

The lower limit of the acetalization degree b of the polyvinyl acetal resin B is preferably 50 mol %, more preferably 52.5 mol %, further preferably 54 mol %, and particularly preferably 60 mol %, and the upper limit thereof is preferably 80 mol %, more preferably 77 mol %, further preferably 74 mol %, and particularly preferably 71 mol %. When the acetalization degree b is the lower limit or more, the sound insulation property of the laminated glass can be further improved. When the acetalization degree b is the upper limit or less, the reaction time required for producing the polyvinyl acetal resin B can be shortened.

A hydroxyl group content b of the polyvinyl acetal resin B is preferably 30 mol % or less, preferably 27.5 mol % or less, preferably 27 mol % or less, preferably 26 mol % or less, preferably 25 mol % or less, preferably 18 mol % or more, preferably 20 mol % or more, preferably 22 mol % or more, and preferably 23 mol % or more. When the hydroxyl group content b is the upper limit or less, the sound insulation property of the laminated glass can be further improved. When the hydroxyl group content b is the lower limit or more, the adhesion force of the interlayer film can be further increased.

The polyvinyl acetal resin B is preferably a polyvinyl butyral resin.

The polyvinyl acetal resin A and the polyvinyl acetal resin B are preferably obtained by acetalizing a polyvinyl alcohol resin having an average polymerization degree exceeding 3000 with an aldehyde. The aldehyde is preferably an aldehyde having a carbon number of 1 to 10 and more preferably an aldehyde having a carbon number of 4 or 5. A lower limit of the average polymerization degree of the polyvinyl alcohol resin is preferably 3010, preferably 3050, preferably 3500, preferably 3600, preferably 4000, and preferably 4050, and an upper limit thereof is preferably 7000, preferably 6000, preferably 5000, preferably 4900, and preferably 4500. The polyvinyl acetal resins A, B in the first layer are particularly preferably obtained by acetalizing a polyvinyl alcohol resin having an average polymerization degree exceeding 3000 and less than 4000. The average polymerization degree of the polyvinyl alcohol resin used for obtaining the polyvinyl acetal resins A, B in the first layer is preferably 3010 or more, more preferably 3020 or more, preferably 4000 or less, more preferably less than 4000, further preferably 3800 or less, particularly preferably 3600 or less, and most preferably 3500 or less because bubble generation and bubble growth in the laminated glass is further reduced; the sound insulation property is sufficiently improved; and the interlayer film can be easily formed.

When the first layer includes a polyvinyl acetate resin (1) and a polyvinyl acetal resin (1), a ratio of the polyvinyl acetate resin (1) in 100% by weight of the total of the polyvinyl acetate resin (1) and the polyvinyl acetal resin (1) is preferably 1% by weight or more, more preferably 10% by weight or more, further preferably 20% by weight or more, particularly preferably 50% by weight more, preferably 99% by weight or less, more preferably 90% by weight or less, and further preferably 80% by weight or less. When the ratio is the upper limit or less, the production efficiency of the interlayer film for laminated glass becomes further higher. When the ratio is the lower limit or more, the sound insulation property of the laminated glass can be further improved.

The second layer preferably includes a thermoplastic resin and more preferably includes a polyvinyl acetal resin (hereinafter, may be referred to as a polyvinyl acetal resin (2)). The third layer preferably includes a thermoplastic resin and more preferably includes a polyvinyl acetal resin (hereinafter, may be referred to as a polyvinyl acetal resin (3)). When the second and the third layers include polyvinyl acetal resins (2), (3), adhesion force between the second and the third layers and the component for laminated glass is sufficiently high. In the second and the third layers, each of the thermoplastic resin may be used singly or in combination of two or more. Each of the polyvinyl acetal resin (2), (3) may be used singly or in combination of two or more. The thermoplastic resins used in the second and the third layers are not particularly limited. The polyvinyl acetal resins (2), (3) used in the second and the third layers are not particularly limited.

Examples of the thermoplastic resin include a polyvinyl acetal resin, an ethylene-vinyl acetate copolymer resin, an ethylene-acrylic copolymer resin, a polyurethane resin and a polyvinyl alcohol resin.

The acetylation degree of the polyvinyl acetal resin (2), (3) is preferably 0 mol % or more, more preferably 0.1 mol % or more, further preferably 0.5 mol % or more, preferably 30 mol % or less, more preferably 20 mol % or less, much more preferably 15 mol % or less, further preferably 10 mol % or less, particularly preferably 5 mol % or less, and most preferably 3 mol % or less. When the acetylation degree is the upper limit or less, the penetration resistance of the interlayer film and the laminated glass are enhanced. When the acetylation degree is the upper limit or less, the bleed-out of the plasticizer can be reduced.

When the acetylation degree of the polyvinyl acetal resins in the polyvinyl acetal resins (2), (3) is 3 mol % or less, mechanical properties of the interlayer film are further enhanced. As a result, the penetration resistance of the laminated glass is further enhanced.

The acetylation degree is obtained as described below. The amount of ethylene group having the acetal group bonded thereto and the amount of ethylene group having the hydroxy group bonded thereto are subtracted from the total amount of ethylene groups in the main chain. The obtained value is divided by the total amount of ethylene groups in the main chain to obtain a molar fraction. The acetylation degree is the molar fraction expressed in percentage. The amount of the ethylene group to which the acetal group or the hydroxy group bonds can be determined, for example, according to JIS K6728 "Testing methods for polyvinyl butyral".

The polyvinyl acetal resin (2), (3) can be produced, for example, by acetalizing a polyvinyl alcohol with an aldehyde. The polyvinyl alcohol can be obtained by, for example, saponifying polyvinyl acetate.

The average polymerization degree of the polyvinyl alcohol for obtaining the polyvinyl acetal resins (2), (3) is preferably 200 or more, more preferably 500 or more, further preferably 1600 or more, particularly preferably 2600 or more, most preferably 2700 or more, preferably 5000 or less, more preferably 4000 or less, and further preferably 3500 or less. When the average polymerization degree is the lower limit or more, the penetration resistance of the laminated glass is further enhanced. When the average polymerization degree is the upper limit or less, molding of the interlayer film is easy.

The average polymerization degree of the polyvinyl alcohol is determined by a method according to JIS K6726 "Testing methods for polyvinyl alcohol".

A carbon number of an acetal group included in the polyvinyl acetal resin is not particularly limited. An aldehyde used at the time of production of the polyvinyl acetal resin is not particularly limited. The carbon number of the acetal group included in the polyvinyl acetal resin is preferably 3 to 5, and more preferably 3 or 4 from the viewpoint of increase in productivity.

The aldehyde is not particularly limited. As the aldehyde, generally, an aldehyde having a carbon number of 1 to 10 is preferably used. Examples of the aldehyde having the carbon number of 1 to 10 include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among them, propionaldehyde, n-butyraldehyde, isobutyraldehyde, n-hexylaldehyde or n-valeraldehyde is preferable; propionaldehyde, n-butyraldehyde, or isobutyraldehyde is more preferable; and n-butyraldehyde is further preferable. The aldehyde can be used singly or in combination of two or more.

Each of the polyvinyl acetal resins (2), (3) is preferably a polyvinyl butyral resin. The interlayer film for laminated glass according to the present invention preferably includes the polyvinyl butyral resin as each of the polyvinyl acetal resins (2), (3) included in the second and the third layers. Synthesis of the polyvinyl butyral resin is easy. By the use of the polyvinyl butyral resin, adhesion force of the interlayer film to the component for laminated glass is further adequately generated. Light resistance and weather resistance are also further improved.

A hydroxyl group content (an amount of the hydroxy group) in each of the polyvinyl acetal resins (2), (3) is preferably 20 mol % or more, more preferably 25 mol % or more, further preferably 30 mol % or more, preferably 50 mol % or less, more preferably 45 mol % or less, further preferably 40 mol % or less, and particularly preferably 35 mol % or less. When the hydroxyl group content is the lower limit or more, the penetration resistance of the laminated glass is further enhanced. When the hydroxyl group content is the upper limit or less, the bleed-out of the plasticizer is difficult to occur. In addition, the interlayer film is more flexible, and therefore, handling of the interlayer film becomes easy.

The hydroxyl group content of the polyvinyl acetal resins (2), (3) is a value expressed in percentage (mol %) of a molar fraction determined by dividing an amount of the ethylene group to which the hydroxy group bonds by an amount of the total ethylene group in the main chain.

An acetalization degree (a butyralization degree in the case of the polyvinyl butyral resin) of each of the polyvinyl acetal resins (2), (3) is preferably 55 mol % or more, more preferably 60 mol % or more, further preferably 63 mol % or more, preferably 85 mol % or less, more preferably 75 mol % or less, and further preferably 70 mol % or less. When the acetalization degree is the lower limit or more, compatibility between the polyvinyl acetal resins (2), (3) and the plasticizer is improved. When the acetalization degree is the upper limit or less, the reaction time required for producing the polyvinyl acetal resin is shortened.

The acetalization degree is a value expressed in percentage (mol %) of a molar fraction determined by dividing an amount of the ethylene group to which the acetal group bonds by an amount of the total ethylene group in the main chain.

The acetalization degree (the butyralization degree) and the acetylation degree of the polyvinyl acetal resin (polyvinyl butyral resin) can be calculated from the result of measurement by a method according to JIS K6728 "Testing methods for polyvinyl butyral" or ASTM D1396-92. The measurement is preferably carried out by the method according to ASTM D1396-92.

From the viewpoint of further improvement of the sound insulation property of the laminated glass, it is preferable that the acetylation degree of the polyvinyl acetal resin in the second layer is 15 mol % or less and the hydroxyl group content thereof is 20 mol % or less. From the viewpoint of further improvement of the sound insulation property of the laminated glass, it is preferable that the acetylation degree of the polyvinyl acetal resin in the third layer is 15 mol % or less and the hydroxyl group content thereof is 20 mol % or less.

(Plasticizer)

The first layer includes a plasticizer (hereinafter may be referred to as a plasticizer (1)). The second layer preferably includes the plasticizer (hereinafter may be referred to as a plasticizer (2)). The third layer preferably includes the plasticizer (hereinafter may be referred to as a plasticizer (3)). Each of the plasticizers (1), (2), (3) may be used singly or in combination of two or more.

Examples of the plasticizers (1), (2), (3) include organic ester plasticizers such as monobasic organic acid esters and polybasic organic acid esters and phosphoric acid plasticizers such as organic phosphate plasticizers and organic phosphite plasticizers. Among them, the organic ester plasticizers are preferable. The plasticizers (1), (2), (3) are preferably liquid plasticizers.

The monobasic organic acid ester is not particularly limited, and examples of the monobasic organic acid ester include a glycol ester obtained by reacting a glycol with a monobasic organic acid and an ester made of triethylene glycol or tripropylene glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexanoic acid, n-nonylic acid and decylic acid.

The polybasic organic acid ester is not particularly limited and examples of the polybasic organic acid ester include ester compounds of polybasic organic acids and alcohols having a linear or a branched structure having a carbon number of 4 to 8. Examples of the polybasic organic acid include adipic acid, sebacic acid, and azelaic acid.

The organic ester plasticizer is not particularly limited and examples of the plasticizer include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dibutyl adipate, dihexyl adipate, dioctyl adipate, hexylcyclohexyl adipate, a mixture of heptyl adipate and nonyl adipate, diisononyl adipate, diisodecyl adipate, heptylnonyl adipate, dibutyl sebacate, oil-modified sebacic alkyds, and a mixture of adipate esters and phosphoric acid esters. Other ester plasticizers other than these plasticizers may be used.

The organic phosphoric acid plasticizers are not particularly limited, and examples of the organic phosphoric acid esters include tributoxyethyl phosphate, isodecylphenyl phosphate, and tri-isopropyl phosphate.

From the viewpoint of further improvement of the sound insulation property of the laminated glass, the plasticizer (1) in the first layer is preferably a diester plasticizer represented by Formula (1). From the viewpoint of further improvement of the sound insulation property of the laminated glass, the plasticizers (2), (3) in the second and the third layers are preferably a diester plasticizer represented by Formula (1).

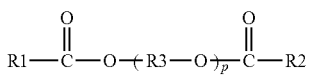

Formula (1)

In Formula (1), R1 and R2 each represents an organic group having a carbon number of 5 to 10; R3 represents an ethylene group, an isopropylene group or a n-propylene group, and p represents an integer of 3 to 10.

The plasticizer (1) preferably includes at least one of dibutyl adipate, triethylene glycol di-n-butanoate (3 GB), triethylene glycol di-n-propanoate (3GE), triethylene glycol di-2-ethylhexanoate (3GO), and triethylene glycol di-2-ethylbutyrate (3GH), more preferably includes at least one of dibutyl adipate, triethylene glycol di-2-ethylhexanoate (3GO), and triethylene glycol di-2-ethylbutyrate (3GH), further preferably includes at least one of triethylene glycol di-2-ethylhexanoate (3GO) and triethylene glycol di-2-ethylbutyrate (3GH), and particularly preferably includes triethylene glycol di-2-ethylhexanoate (3GO).

From the viewpoint of further improvement of the sound insulation property of the laminated glass, the polyvinyl acetate resin and the plasticizer (1) in the first layer are preferably used in a combination to show a cloud point of 80° C. or less that is measured by using a solution in which 8 parts by weight of the polyvinyl acetate resin is dissolved in 100 parts by weight of the plasticizer (1).

Each of the plasticizers (2), (3) preferably include at least one of dibutyl adipate, triethylene glycol di-n-butanoate (3 GB), triethylene glycol di-n-propanoate (3GE), triethylene glycol di-2-ethylhexanoate (3GO), and triethylene glycol di-2-ethylbutyrate (3GH), more preferably includes at least one of dibutyl adipate, triethylene glycol di-2-ethylhexanoate (3GO), and triethylene glycol di-2-ethylbutyrate (3GH), further preferably includes at least one of triethylene glycol di-2-ethylhexanoate (3GO) and triethylene glycol di-2-ethylbutyrate (3GH), and particularly preferably includes triethylene glycol di-2-ethylhexanoate.

In the first layer, a content of the plasticizer (1) to 100 parts by weight of the polyvinyl acetate resin (1) is preferably 25 parts by weight or more and preferably 80 parts by weight or less. From the viewpoint of further improvement of the sound insulation property of the laminated glass, the content of the plasticizer (1) to 100 parts by weight of the polyvinyl acetate resin in the first layer is more preferably 30 parts by weight or more, and more preferably 70 parts by weight or less, further preferably 60 parts by weight or less, and particularly preferably 50 parts by weight or less. In addition, when the content of the plasticizer (1) is the lower limit or more, the interlayer film has higher flexibility and easier handling, and further, the penetration resistance of the laminated glass is further enhanced. When the content of the plasticizer (1) is the upper limit or less, transparency of the interlayer film is further improved. From the viewpoint of further improvement of the production efficiency of the interlayer film, the content of the plasticizer (1) to 100 parts by weight of the polyvinyl acetate resin (1) in the first layer is preferably 30 parts by weight or more and preferably 70 parts by weight or less.

When the first layer includes the polyvinyl acetate (1) and the polyvinyl acetal resin (1), the content of the plasticizer (1) to 100 parts by weight of the total of the polyvinyl acetate (1) and the polyvinyl acetal resin (1) is preferably 25 parts by weight, more preferably 30 parts by weight or more, preferably 80 parts by weight or less, more preferably 70 parts by weight or less, further preferably 60 parts by weight or less, and particularly preferably 50 parts by weight or less. When the content of the plasticizer (1) is the lower limit or more, the interlayer film has higher flexibility and easier handling, and further, the penetration resistance of the laminated glass is further enhanced. When the content of the plasticizer (1) is the upper limit or less, transparency of the interlayer film is further improved.

In the second layer, a content of the plasticizer (2) to 100 parts of the polyvinyl acetal resin (2) is preferably 5 parts by weight or more, more preferably 10 parts by weight or more, further preferably 15 parts by weight or more, preferably 50 parts by weight or less, more preferably 45 parts by weight or less, and further preferably 40 parts by weight or less. In the third layer, a content of the plasticizer (3) to 100 parts of the polyvinyl acetal resin (3) is preferably 5 parts by weight or more, more preferably 10 parts by weight or more, further preferably 15 parts by weight or more, preferably 50 parts by weight or less, more preferably 45 parts by weight or less, and further preferably 40 parts by weight or less. When the contents of the plasticizers (2), (3) are the lower limit or more, flexibility of the interlayer film is higher and handling of the interlayer film becomes easy. When the contents of the plasticizers (2), (3) are the upper limit or less, the penetration resistance of the laminated glass is further enhanced.

The content of the plasticizer (2) in the second layer to 100 parts by weight of the polyvinyl acetal resin (2) in the second layer (hereinafter may be referred to as a content (2)) is preferably less than the content of the plasticizer (1) in the first layer to 100 parts by weight of the polyvinyl acetate resin (1) in the first layer (hereinafter may be referred to as a content (1)). The content of the plasticizer (3) in the third layer to 100 parts by weight of the polyvinyl acetal resin (3) in the third layer (hereinafter may be referred to as a content (3)) is preferably less than the content of the plasticizer (1) in the first layer to 100 parts by weight of the polyvinyl acetate resin (1) in the first layer (hereinafter may be referred to as a content (1)). When the contents (2), (3) are less than the content (1), the penetration resistance of the laminated glass is further enhanced.

Each absolute value of difference between the content (1) and the content (2) and absolute value of difference between the content (1) and the content (3) is preferably 5 parts by weight or more, more preferably 10 parts by weight or more, further preferably 15 parts by weight or more, particularly preferably 20 parts by weight or more, preferably 40 parts by weight or less, more preferably 35 parts by weight or less, and further preferably 30 parts by weight or less. When the absolute values of the differences between the content (1) and each of the contents (2), (3) are the lower limit or more, the sound insulation property of the laminated glass is further improved, whereas when the absolute values thereof are the upper limit or less, the penetration resistance of the laminated glass is further enhanced.

(Tackifier)

The first layer preferably includes a tackifier. When the first layer includes the tackifier, adhesion between the first layer to the second and the third layers is further improved and the penetration resistance of the laminated glass is further enhanced. The inventors of the present invention have found that the first layer includes the tackifier, and thereby, the sound insulation property of the laminated glass is also improved. The first layer includes the tackifier, and thereby, the sound insulation property of the laminated glass in the high frequency range can also be improved.

Examples of the tackifier include rosin resins, terpene resins, and petroleum resins. The tackifier may be used singly or in combination of two or more. The second and the third layers may include or may not include the tackifier.

From the viewpoint of further improvement of the sound insulation property of the laminated glass, the tackifier is preferably the rosin resin.

The rosin resin is a resin made of rosin or a rosin derivative as a base. Examples of the rosin resin include rosin, acid-modified rosin, a rosin-containing diol, a rosin ester, a hydrogenated rosin ester, and a maleic acid-modified rosin ester. An example of the acid-modified rosin includes acrylic acid-modified rosin.

A content of the tackifier to 100 parts by weight of the polyvinyl acetate resin (1) in the first layer is preferably 10 parts by weight or more, more preferably 20 parts by weight or more, further preferably 25 parts by weight or more, particularly preferably 30 parts by weight or more, most preferably 50 parts by weight or more, preferably 500 parts by weight or less, more preferably 300 parts by weight or less, further preferably 100 parts by weight or less, and particularly preferably 90 parts by weight or less. When the content of the tackifier is the lower limit or more, the sound insulation property of the laminated glass is further improved. When the content exceeds the upper limit, the tackifier may become excessive in order to improve the sound insulation property.

(Other Components)

Each of the first, the second, and the third layers, if necessary, may include additives such as an ultraviolet absorber, an antioxidant, a light stabilizer, a flame retardant, an antistatic agent, a pigment, a dye, an adhesion modifier, a moisture resistance agent, a fluorescent whitening agent, and an infrared absorbing agent. These additives may be used singly or in combination of two or more.

(Interlayer for Laminated Glass)

From the viewpoint of further improvement of the sound insulation property of the laminated glass, a peak temperature of tan δ of the interlayer film for laminated glass according to the present invention that appears at the lowest temperature side measured at a frequency of 1 Hz is preferably 0° C. or less.

From the viewpoint of further improvement of the sound insulation property of the laminated glass in low temperature, a maximum value of the tan δ at the peak temperature of the tan δ that appears at the lowest temperature side measured at a frequency of 1 Hz is preferably 1.15 or more, and more preferably 1.25 or more.

From the viewpoint of further improvement of the sound insulation property of the laminated glass in high temperature, a maximum value of the tan δ at the peak temperature of the tan δ that appears at the highest temperature side measured at a frequency of 1 Hz is preferably 0.50 or more.

When the peak temperature of the tan δ that appears at the lowest temperature side, the maximum value of the tan δ at the peak temperature of the tan δ that appears at the lowest temperature side, and the maximum value of the tan δ at the peak temperature of the tan δ that appears at the highest temperature side are measured, the measurement is preferably carried out after the interlayer film for laminated glass is stored under the condition of 23° C. for 1 month.

A thickness of the first layer is preferably 0.02 mm or more, more preferably 0.05 mm or more, preferably 1.8 mm or less, and more preferably 0.5 mm or less. When the thickness of the first layer is the lower limit or more and the upper limit or less, the thickness of the interlayer film is not too thick and the sound insulation property of the laminated glass is further improved.

Each thickness of the second and the third layers is preferably 0.1 mm or more, more preferably 0.2 mm or more, preferably 1 mm or less, and more preferably 0.5 mm or less. When the thicknesses of the second and the third layers are the lower limit or more and the upper limit or less, the thickness of the interlayer film is not too thick; the sound insulation property of the laminated glass is further improved; and further the bleed-out of the plasticizer can be reduced.

A thickness of the interlayer film for laminated glass according to the present invention is preferably 0.1 mm or more, more preferably 0.25 mm or more, preferably 3 mm or less, and more preferably 1.5 mm or less. When the thickness of the interlayer film is the lower limit or more, the penetration resistance of the laminated glass is sufficiently high. When the thickness of the interlayer film is the upper limit or less, transparency of the interlayer film is further improved.

A method for producing the interlayer film for laminated glass according to the present invention is not particularly limited. As the method for producing the interlayer film, a heretofore known method can be used. For example, a method in which the polyvinyl acetate resin or the polyvinyl acetal resin and the plasticizer and the other formulated components if necessary are kneaded to form the interlayer film is included. A production method using an extruder is preferable because the method is suitable for continuous production.

The kneading method is not particularly limited. Examples of the kneading method include a method using an extruder, a plastograph, a kneader, a Banbury mixer or a calendar roll. Among them, the method using the extruder is preferable because the method is suitable for the continuous production, and the method using a twin screw extruder is more preferable. The interlayer film for laminated glass according to the present invention may be obtained by separately preparing the first layer and the second and the third layers, and thereafter, laminating the first layer and the second and the third layers, or may be obtained by laminating the first layer and the second and the third layers by co-extrusion.

Since production efficiency of the interlayer film is excellent, the same polyvinyl acetal resin is preferably included in the second and the third layers; the same polyvinyl acetal resin and the same plasticizer are more preferably included in the second and the third layers; and the second and the third layers are further preferably formed by the same resin composition.

(Laminated Glass)

In FIG. 2, an example of the laminated glass using the interlayer film for laminated glass of an embodiment of the present invention is illustrated by a cross-sectional view.

A laminated glass 11 illustrated in FIG. 2 includes the interlayer film 1 and a first and a second components for laminated glass 21, 22. The interlayer film 1 is sandwiched between the first and the second components for laminated glass 21, 22. The first component for laminated glass 21 is laminated on a first surface 1a of the interlayer film 1. The second component for laminated glass 22 is laminated on a second surface 1b opposite to the first surface 1a of the interlayer film 1. The first component for laminated glass 21 is laminated on an outer surface 3a of the second layer 3. The second component for laminated glass 22 is laminated on an outer surface 4a of the third layer 4.

As described above, the laminated glass according to the present invention includes the first component for laminated glass, the second component for laminated glass, and the interlayer film sandwiched between the first and the second components for laminated glass, and the interlayer film for laminated glass of the present invention is used as the interlayer film.

Examples of the first and the second components for laminated glass (laminated glass configuration components) include a glass plate and a PET (polyethylene terephthalate) film. The laminated glass includes not only the laminated glass made by sandwiching the interlayer film between the two glass plates, but also a laminated glass made by sandwiching the interlayer film between the glass plate and the PET film or the like. The laminated glass is a laminated body including the glass plate, and at least one glass plate is preferably used in the laminated glass.

Examples of the glass plate include inorganic glass and organic glass. Examples of the inorganic glass include a float plate glass, a heat ray absorbing plate glass, a heat-reflecting plate glass, a polished plate glass, a figured plate glass, a wire plate glass, and a green glass. The organic glass is synthetic resin glass substituted for the inorganic glass. Examples of the organic glass include a polycarbonate plate and a poly(meth)acrylic resin plate. An example of the poly(meth)acrylic resin plate includes a polymethyl(meth) acrylate plate.

Although thicknesses of the first and the second components for laminated glass are not particularly limited, the thicknesses are preferably in a range of 1 mm to 5 mm. When the component for laminated glass is a glass plate, a thickness of the glass plate is preferably in a range of 1 mm to 5 mm. When the component for laminated glass is a PET film, a thickness of the PET film is preferably in a range of 0.03 mm to 0.5 mm.

A method for producing the laminated glass is not particularly limited. For example, the interlayer film is sandwiched between the first and the second components for laminated glass, and then, passed through pressure rolls or subjected to decompression suction in a rubber bag, so that the air remaining between the first and the second components for laminated glass and the interlayer film is removed. Thereafter, a laminated body is obtained by pre-adhering the first and the second components for laminated glass and the interlayer film at 70° C. to 110° C. Subsequently, the laminated body is press-bonded under a pressure of 1 MPa to 1.5 MPa at about 120° C. to 150° C. by entering into an autoclave or pressing. As described above, the laminated glass can be obtained.

The laminated glass can be used for automobiles, railway cars, aircraft, ships, and architectural structures. The laminated glass can be used for other applications in addition to these applications. The interlayer film is preferably an interlayer film for architectural use and automotive use, and more preferably the interlayer film for automotive use. The laminated glass is preferably laminated glass for architectural use and automotive use, and more preferably the laminated glass for automotive use. The interlayer film and the laminated glass can be used for other applications in addition to these applications. The interlayer film and the laminated glass are preferably used in an electric vehicle using an electric motor and a hybrid electric vehicle using an internal combustion engine and an electric motor. The laminated glass can be used for a windshield, a side glass, a rear glass, and a roof glass of an automobile.

Hereinafter the present invention will be described in detail with reference to Examples. The present invention, however, is not limited to these Examples.

In Examples and Comparative Examples, polyvinyl acetate resins a, b, c, d and polyvinyl acetal resins a, b, c, d, e described below were used. The butyralization degree (acetalization degree), the acetylation degree, and the hydroxyl group content of the polyvinyl acetal resins a, b, c, d, e as polyvinyl butyral resins were measured by a method according to ASTM D1396-92. When these properties were measured by JIS K6728 "Testing methods for polyvinyl butyral", same values to the values determined by the method according to ASTM D1396-92 were obtained.

Polyvinyl acetate resin a (PVAc (a)): polymerization degree 1700

Polyvinyl acetate resin b (PVAc (b)): polymerization degree 5000

Polyvinyl acetate resin c (PVAc (c)): polymerization degree 10000

Polyvinyl acetate resin d (PVAc (d)): polymerization degree 15000

Polyvinyl acetal resin a (PVB (a)): acetylation degree 12.8 mol %, butyralization degree 63.5 mol %, hydroxyl group content 23.7 mol %, n-butyraldehyde was used for acetalization Polyvinyl acetal resin b (PVB (b)): acetylation degree 1 mol %, butyralization degree 65.5 mol %, hydroxyl group content 33.5 mol %, n-butyraldehyde was used for acetalization Polyvinyl acetal resin c (PVB (c)): acetylation degree 1 mol %, butyralization degree 68.5 mol %, hydroxyl group content 30.5 mol %, n-butyraldehyde was used for acetalization Polyvinyl acetal resin d (PVB (d)): acetylation degree 1 mol %, butyralization degree 70.3 mol %, hydroxyl group content 28.7 mol %, n-butyraldehyde was used for acetalization Polyvinyl acetal resin e (PVB (e)): acetylation degree 1.5 mol %, butyralization degree 69 mol %, hydroxyl group content 29.5 mol %, n-butyraldehyde was used for acetalization The following plasticizers were used in Examples and Comparative Examples.

Dibutyl adipate (DBA)
Triethylene glycol di-n-butanoate (3 GB)
Triethylene glycol di-n-propanoate (3GE)
Triethylene glycol di-2-ethylhexanoate (3GO)

The following tackifiers were used in Examples and Comparative Examples.

Rosin resin (KE-311, manufactured by ARAKAWA CHEMICAL INDUSTRIES, LTD., "PINECRYSTAL KE-311") Acrylic acid-modified rosin (KE-604, manufactured by ARAKAWA CHEMICAL INDUSTRIES, LTD., "PINECRYSTAL KE-604")

Rosin-containing diol (D-6011, manufactured by ARAKAWA CHEMICAL INDUSTRIES, LTD., "PINECRYSTAL D-6011")

Example 1

The polyvinyl acetate resin a (100 parts by weight) and dibutyl adipate (DBA) as the plasticizer (50 parts by weight) were sufficiently kneaded with a mixing roll to obtain a composition for an intermediate layer.

The polyvinyl butyral resin b (100 parts by weight) and dibutyl adipate (DBA) as the plasticizer (34 parts by weight) were sufficiently kneaded to obtain a composition for a protection layer.

The obtained composition for the intermediate layer and composition for the protection layer were molded by using a co-extruder to prepare an interlayer film (a thickness of 0.8 mm) having a laminated structure of protection layer B (a thickness of 0.35 mm)/intermediate layer A (a thickness of 0.1 mm)/protection layer B (a thickness of 0.35 mm).

The obtained interlayer film (the multi-layer film) was cut to a width of 30 mm and a length of 320 mm. Subsequently, the interlayer film was sandwiched between two transparent float glasses (a width of 25 mm, a length of 305 mm, and a thickness of 2.0 mm) and the sandwiched interlayer film was maintained in a vacuum laminator at 90° C. for 30 minutes and pressed under vacuum to obtain a laminated body. In the laminated body, a part of the interlayer film protruding from the glass was trimmed off to obtain a laminated glass.

Example 2

The polyvinyl acetate resin a (100 parts by weight), dibutyl adipate (DBA) as the plasticizer (50 parts by weight), and the rosin resin (KE-311, manufactured by ARAKAWA CHEMICAL INDUSTRIES, LTD., "PINECRYSTAL KE-311") as a tackifier (30 parts by weight) were sufficiently kneaded with the mixing roll to obtain a composition for an intermediate layer.

An interlayer film and a laminated glass were obtained in a similar manner to Example 1 except that an intermediate layer A is prepared by using the obtained composition for the intermediate layer and a type and a content of the polyvinyl butyral resin and a content of the plasticizer used for a protection layer B were set as shown in Table 1.

Examples 3 to 12 interlayer films and laminated glasses were obtained in a similar manner to Example 1 except that types and contents of the polyvinyl acetate resins and types and contents of the plasticizers used in the intermediate layers and types and contents of the polyvinyl butyral resins and types and contents of the plasticizers used for protection layers B were set as shown in Table 1 and 2. The tackifier was not used in Examples 3 to 12.

Examples 13 and 14 interlayer films and laminated glasses were obtained in a similar manner to Example 1 except that types and contents of the tackifiers used in the intermediate layer were set as shown in Table 2.

Comparative Example 1

An interlayer film and a laminated glass were obtained in a similar manner to Example 1 except that a type and a content of the polyvinyl butyral resin and a type and a content of the plasticizer used for an intermediate layer A and a protection layer B were set as shown in Table 1. In Comparative Example 1, triethylene glycol di-2-ethylhexanoate (3GO) was used as the plasticizer. The tackifier was not used in Comparative Example 1.

(Evaluation)

(1) Cloud Point Measured Using Polyvinyl Acetate Resin or Polyvinyl Acetal Resin and Plasticizer Included in Intermediate Layer (1-1) Cloud Point Measured by the First Method for Determining Cloud Point Each plasticizer used in the intermediate layer of 3.5 g (100 parts by weight) and each polyvinyl acetate resin or polyvinyl acetal resin used in the intermediate layer of 0.28 g (8 parts by weight) were provided. The plasticizer of 3.5 g (100 parts by weight) and the polyvinyl acetate resin or the polyvinyl acetal resin of 0.28 g (8 parts by weight) were mixed in a test tube (a diameter of 2 cm) to obtain a solution in which the polyvinyl acetate resin or the polyvinyl acetal resin was dissolved in the plasticizer. After the solution in the test tube was heated to 150° C., the test tube was allowed to stand under an atmosphere of −20° C. to lower a temperature of the solution to −15° C. At this time, a temperature at which a part of the solution started to generate cloudiness was visually observed, and the temperature was determined to be the cloud point.

With respect to the solution in which the cloud point did not appear even at −15° C., the solution was cooled to the pour point of the plasticizer under an atmosphere of −196° C. using liquid nitrogen to lower the temperature. At this time, a temperature at which a part of the solution started to generate cloudiness was visually observed, and the temperature was determined to be the cloud point. In Tables 1 and 2 shown below, the cloud point was measured by the first method for determining the cloud point.

(1-2) Cloud Point Measured by the Second Method for Determining Cloud Point

Each plasticizer used in the intermediate layer of 3.5 g (100 parts by weight) and each polyvinyl acetate resin or polyvinyl acetal resin used in the intermediate layer of 0.28 g (8 parts by weight) were provided. The plasticizer of 3.5 g (100 parts by weight) and the polyvinyl acetate resin or the polyvinyl acetal resin of 0.28 g (8 parts by weight) were mixed in a test tube (a diameter of 2 cm) to obtain a solution in which the polyvinyl acetate resin or the polyvinyl acetal resin was dissolved in the plasticizer. The solution in the test tube was heated to 150° C. and the test tube was allowed to stand for 1 hour in constant temperature rooms of 5° C., 0° C., and −5° C., and thereafter, a haze of the solution in the test tube was measured with a haze-meter with the temperatures of the constant temperature rooms being maintained. A maximum temperature at which the haze is 10% or more was determined to be the cloud point. The haze was measured using the haze-meter (manufactured by Tokyo Denshoku Co., Ltd., "TC-HIIIDPK") according to JIS K6714.

As a result, in Examples 1 to 14 and Comparative Example 1, even after the test tube was allowed to stand for 1 hour in the constant temperature room of 80° C., the solution did not show a haze of 10% or more.

(2) Peak Temperature at Lower Temperature Side, Maximum Value of Peak of Tan δ at Lower Temperature Side, and Maximum Value of Peak of Tan δ at Higher Temperature Side After the obtained interlayer film was stored for 1 month under the condition of 23° C., a peak temperature of the tan δ that appears at the lowest temperature side, a maximum value of tan δ at the peak temperature of the tan δ that appears at the lowest temperature side, and a maximum value of tan δ at the peak temperature of the tan δ that appears at the highest temperature side were measured by cutting out the interlayer film in a circle shape having a diameter of 8 mm and measuring temperature variance of dynamic viscoelasticity at a temperature rising rate of 5° C./minute under conditions of an amount of distortion of 1.0% and a frequency of 1 Hz by a shearing method using a viscoelasticity measuring apparatus (manufactured by Rheometrics Co., "ARES").

(3) Loss Factor

The obtained laminated glass was stored for 1 month under the condition of 20° C. For the laminated glass stored for 1 month under the condition of 20° C., a loss factor was measured under conditions of 20° C. by a central exciting method using a measurement apparatus "SA-01" (manufactured by RION Co., Ltd.). A loss factor (loss factor at 20° C.) in a fourth mode (near 3150 Hz) at a resonance frequency of the obtained loss factor was evaluated.

For the laminated glass stored for 1 month under the condition of 20° C., a loss factor was also measured under conditions of 30° C. by the central exciting method using the measurement apparatus "SA-01" (manufactured by RION Co., Ltd.). A loss factor (loss factor at 30° C.) in a sixth mode (near 6300 Hz) at a resonance frequency of the obtained loss factor was evaluated.

The results are shown in Table 1 and 2.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Intermediate layer A | Resin | Type | PVAc(a) | PVAc(a) | PVAc(a) | PVAc(a) | PVAc(a) | PVAc(a) | PVAc(a) |
| | | Content (parts by weight) | 100 | 100 | 100 | 100 | 100 | 100 | 100 |
| | | Type of plasticizer | DBA | DBA | 3GB | 3GE | DBA | DBA | DBA |
| | | Content of plasticizer (parts by weight) | 50 | 50 | 50 | 50 | 50 | 50 | 50 |
| | Tackifier | Type | — | KE-311 | — | — | — | — | — |
| | | Amount (parts by weight) | — | 30 | — | — | — | — | — |
| Protection layer B | Resin | Type | PVB(b) | PVB(b) | PVB(c) | PVB(c) | PVB(c) | PVB(d) | PVB(e) |
| | | Butyralization degree (mol %) | 65.5 | 65.5 | 68.5 | 68.5 | 68.5 | 70.3 | 69 |
| | | Acetylation degree (mol %) | 1 | 1 | 1 | 1 | 1 | 1 | 1.5 |
| | | Content (parts by weight) | 100 | 100 | 100 | 100 | 100 | 100 | 100 |
| | | Type of plasticizer | DBA | DBA | 3GB | 3GE | DBA | DBA | DBA |
| | | Content of plasticizer (parts by weight) | 34 | 33 | 33 | 33 | 35 | 36 | 36.5 |
| | | Film configuration | B/A/B | B/A/B | B/A/B | B/A/B | B/A/B | B/A/B | B/A/B |
| | | Cloud point measured using resin and Plasticizer (° C.) | 75 | 75 | 76 | 72 | 75 | 75 | 75 |
| | | Peak temperature of tan δ at lower temperature side (° C.) | −2.2 | −1.4 | −2.5 | −2.9 | −3.1 | −2.4 | −3.6 |
| | | Maximum value of peak of tan δ at lower temperature side | 1.52 | 1.81 | 1.64 | 1.7 | 1.67 | 1.63 | 1.64 |
| | | Maximum value of peak of tan δ at higher temperature side | 0.51 | 0.5 | 0.52 | 0.54 | 0.51 | 0.5 | 0.52 |
| | | Loss factor at 20° C. near 3150 Hz | 0.54 | 0.69 | 0.55 | 0.56 | 0.53 | 0.51 | 0.52 |
| | | Loss factor at 30° C. near 6300 Hz | 0.17 | 0.23 | 0.18 | 0.18 | 0.17 | 0.16 | 0.17 |

TABLE 2

| | | | Ex. 8 | Ex. 9 | Ex. 10 | Ex. 11 | Ex. 12 | Ex. 13 | Ex. 14 | Comp. Ex. 1 |
|---|---|---|---|---|---|---|---|---|---|---|
| Intermediate layer A | Resin | Type | PVAc(b) | PVAc(c) | PVAc(d) | PVAc(c) | PVAc(c) | PVAc(a) | PVAc(a) | PVB(a) |
| | | Content (parts by weight) | 100 | 100 | 100 | 100 | 100 | 100 | 100 | 100 |
| | | Type of plasticizer | DBA | DBA | DBA | DBA | DBA | DBA | DBA | 3GO |
| | | Content of plasticizer (parts by weight) | 50 | 50 | 50 | 30 | 70 | 50 | 50 | 60 |

TABLE 2-continued

|  |  |  | Ex. 8 | Ex. 9 | Ex. 10 | Ex. 11 | Ex. 12 | Ex. 13 | Ex. 14 | Comp. Ex. 1 |
|---|---|---|---|---|---|---|---|---|---|---|
|  | Tackifier | Type | — | — | — | — | — | KE-604 | D-6011 | — |
|  |  | Amount (parts by weight) | — | — | — | — | — | 30 | 30 | — |
| Protection layer B | Resin | Type | PVB(c) | PVB(c) | PVB(c) | PVB(c) | PVB(c) | PVB(b) | PVB(b) | PVB(c) |
|  |  | Butyralization degree (mol %) | 68.5 | 68.5 | 68.5 | 68.5 | 68.5 | 65.5 | 65.5 | 68.5 |
|  |  | Acetylation degree (mol %) | 1 | 1 | 1 | 1 | 1 | 1 | 1 | 1 |
|  |  | Content (parts by weight) | 100 | 100 | 100 | 100 | 100 | 100 | 100 | 100 |
|  | Type of plasticizer |  | DBA | DBA | DBA | DBA | DBA | DBA | DBA | 3GO |
|  | Content of plasticizer (parts by weight) |  | 35 | 35 | 35 | 38 | 32 | 33 | 33 | 38.5 |
|  | Film configuration |  | B/A/B | B/A/B | B/A/B | B/A/B | B/A/B | B/A/B | B/A/B | B/A/B |
| Cloud point measured using resin and Plasticizer (° C.) |  |  | 77 | 78 | 78 | 78 | 78 | 75 | 75 | 19 |
| Peak temperature of tan δ at lower temperature side (° C.) |  |  | −3.1 | −2.6 | −2.9 | −2.2 | −2.8 | −1.6 | −3.1 | −1.8 |
| Maximum value of peak of tan δ at lower temperature side |  |  | 1.68 | 1.65 | 1.63 | 1.62 | 1.63 | 1.84 | 1.79 | 1.05 |
| Maximum value of peak of tan δ at higher temperature side |  |  | 0.51 | 0.52 | 0.51 | 0.54 | 0.53 | 0.52 | 0.51 | 0.54 |
| Loss factor at 20° C. near 3150 Hz |  |  | 0.53 | 0.51 | 0.52 | 0.5 | 0.51 | 0.69 | 0.66 | 0.28 |
| Loss factor at 30° C. near 6300 Hz |  |  | 0.17 | 0.16 | 0.17 | 0.16 | 0.16 | 0.24 | 0.22 | 0.09 |

EXPLANATION OF SYMBOLS

1. Interlayer film
1a. First surface
1b. Second surface
2. First layer
2a. First surface
2b. Second surface
3. Second layer
3a. Outer surface
4. Third layer
4a. Outer surface
11. Laminated glass
21. First component for laminated glass
22. Second component for laminated glass

The invention claimed is:

1. An interlayer film for laminated glass comprising:
a first layer;
a second layer laminated on a first surface of the first layer; and
a third layer laminated on a second surface opposite to the first surface of the first layer,
wherein only the first layer among the first, second and third layers comprises a polyvinyl acetate resin,
the first layer comprises a combination of the polyvinyl acetate resin and a plasticizer, and
a content of the plasticizer in the first layer to 100 parts by weight of the polyvinyl acetate resin in the first layer is 25 parts by weight or more and 80 parts by weight or less, and
wherein the combination of the polyvinyl acetate resin and the plasticizer comprised in the first layer has a cloud point of 80° C. or less when the cloud point is measured by using a solution in which 8 parts by weight of the polyvinyl acetate resin is dissolved in 100 parts by weight of the plasticizer.

2. The interlayer film for laminated glass according to claim 1,
wherein the first layer comprises a tackifier.

3. The interlayer film for laminated glass according to claim 2, wherein the second and third layers do not contain the tackifier.

4. The interlayer film for laminated glass according to claim 3, wherein a content of the tackifier in the first layer to 100 parts by weight of the polyvinyl acetate resin in the first layer is 50 parts by weight or more and 90 parts by weight or less.

5. The interlayer film for laminated glass according to claim 1,
wherein the second layer comprises a polyvinyl acetal resin,
the polyvinyl acetal resin in the second layer has an acetylation degree of 15 mol % or less and a hydroxyl group content of 20 mol % or more,
the third layer comprises a polyvinyl acetal resin, and
the polyvinyl acetal resin in the third layer has an acetylation degree of 15 mol % or less and a hydroxyl group content of 20 mol % or more.

6. The interlayer film for laminated glass according to claim 5,
wherein the first layer comprises a tackifier; and
the tackifier is a rosin resin.

7. The interlayer film for laminated glass according to claim 1,
wherein the first layer further comprises a polyvinyl acetal resin, and a ratio of the polyvinyl acetate resin in the first layer in 100% by weight of the total of the polyvinyl acetate resin and the polyvinyl acetal resin in the first layer is 50% by weight or more.

8. A laminated glass comprising:
a first component for laminated glass,
a second component for laminated glass, and
an interlayer film sandwiched between the first component for laminated glass and the second component for laminated glass,
wherein the interlayer film is the interlayer film for laminated glass according to claim 1.

* * * * *